Patented June 6, 1950

2,510,366

UNITED STATES PATENT OFFICE 2,510,366

RODENT REPELLENT

Luther L. Baumgartner, Yonkers, N. Y., assignor to The B. F. Goodrich Company, New York, N. Y., a corporation of New York No Drawing. Application July 2, 1947, Serial No. 758,711

4 Claims. (Cl. 167—46)

This invention relates to pest combatting compositions and more specifically to rodent repellent compositions containing as their active ingredient a thioureylene aliphatic monocarboxylic acid.

The control of rodents in the United States has become a serious problem. It has been estimated by the U. S. Department of Interior, Division of Predator and Rodent Control that rats alone annually cause two dollars damage for each person of the country even after more than forty years of effort in attempting to reduce rat populations and prevent damage. In addition, many other rodents cause considerable damage to crops and stored materials. For example, pine mice (Pitymys sp.) and orchard mice (Microtus sp.) have frequently put entire peach and apple orchards out of production by girdling the trees and eventually killing them. In fact, a small colony of only five to ten mice can in one winter kill a fruit tree valued at several hundred dollars. Rabbits also cause great damage to garden and truck crops by consuming the young plants and to fruit trees and nursery stock by girdling the trees and shrubs. Woodchucks also have similar depredating habits. It has also been reported that, in one season, porcupines caused a 10–25% loss of the sweet corn crop grown for the canning industry in Maine.

To reduce these damages many methods of rodent control have been suggested. These methods fall within two general classes. The first general class approaches the problem of control by attempting to kill the pests either by the use of traps or by the use of poisons. The second general class approaches the control problem by the use of either mechanical repellent means as for example by the use of such mechanical devices as fences, guards, and the like through which the rodent pests can not go, or by the use of a chemical repellent material which is obnoxious to such senses of the rodents as smell and taste. Through the course of years of experimentation it has become a recognized fact that in order to achieve the best results of control, both killing and repelling must be employed simultaneously to protect crops and stored goods and merchandise from rodent destruction, for neither method alone has been successful.

Killing rodent pests by trapping or poisoning is not entirely successful because the rodents have an uncanny ability to learn to avoid traps and poisoned baits. Thus, in the case of rat control, the rats will in a short time avoid the poisoned baits and continue to attack the crops, stored goods, or whatever is to be protected. As a rule, it is undesirable to treat the material to be protected with the poisonous material, especially if it is foodstuff that is being protected, for the rodent poisons either are injurious to the consumer of the food products, or the poisons are such materials which will in some manner make the foodstuff less attractive to the consumer. Another disadvantage which is brought about by the use of rodent poisons is that the rodent must consume a sufficient amount of the material to be protected to ingest a lethal dose of the poison. In doing this, the rodent has caused serious damage to a unit of the material because of the removal of a portion of it, or, where the material is packaged, by removing a sufficient portion of the packaging means allowing some of the material to find its way out and be contaminated, or to allow the entrance of other rodents to the packaged goods without exposing them to the poison, or to allow the entrance of insect and fungus pests which are equally destructive. If the poison does not act instantaneously, and few if any do, the rodent can continue his destructive gnawing before the poison takes its toll.

Accordingly, to protect materials from rodent destruction, it is necessary to use some material to repel the rodent before his gnawing has caused any destruction or contamination of the materials to be protected. Since the rodents can circumvent mechanical means of prohibiting them from materials to be protected, the best means of repelling the rodents is to employ a chemical compound as a repellent which is in some manner objectionable to the rodent. A chemical compound to be a useful repellent must have the following general properties: It must not make the material to be protected poisonous to the ultimate consumer, it must not be obnoxious in odor or taste or be poisonous to man or domesticated animals, it must not be phytotoxic, and it must not have any appreciable chemical activity with the material it is to protect. It is also desirable that repellent compounds be easily and economically prepared.

I have discovered that thioureylene aliphatic monocarboxylic acids and such derivatives of these acids as the esters, acid salts, as well as the quaternary ammonium salts of these thioureylene acids are effective rodent repellents meeting the requirements above stated and are especially effective repellents for wild rats and mice. These substituted aliphatic acids and their salts and esters when incorporated with the favorite foods of rats and mice in concentrations as low as 0.5% will prevent starving rats and mice from feeding. In fact, rats and mice confined in cages with their favorite food so treated have starved to death before they will feed on the treated food. In the few cases where starving captive rats have fed on the treated food, it was found that the relatively small amounts of the thioureylene aliphatic monocarboxylic acid derivatives ingested were lethal. The organs of the deceased animals were examined and all showed advanced degrees of edema of the lungs. Occasional dead wild rats were found during field tests of these rodent repellents, and these dead rats also showed edema of the lungs.

The thioureylene aliphatic monocarboxylic acids can be represented as having the following formulae:

I 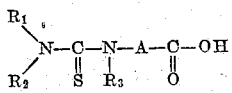

or in agreement with the unsymmetrical Werner formula for urea:

II 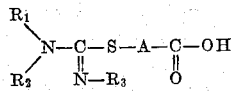

where $R_1$, $R_2$ and $R_3$ can be hydrogen or alkyl, aryl and aralkyl radicals and A is a bivalent saturated straight or branched open chain hydrocarbon radical.

Hereinafter the thioureylene aliphatic monocarboxylic acids having the form represented by Formula I is referred to as normal thioureylene aliphatic monocarboxylic acid and those having the form represented by Formula II are referred to as isothioureylene aliphatic monocarboxylic acid. The nomenclature of the esters and the various salts follows that of the corresponding acid. It is to be understood that compounds having either of the above formulae are effective in this invention and are included in the term "thioureylene aliphatic monocarboxylic acids."

In the nomenclature of specific thioureylene aliphatic monocarboxylic acids, esters and salts, the designation of the positions of the substituents on the nitrogen atoms conforms to the positions of the nitrogen atoms in the structural representations of the thioureylene groups attached to the acids, as

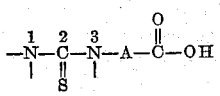

and

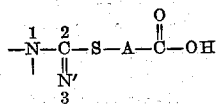

N- designates substituents on the nitrogen atom in the 1 position and N'- designates the substituents on the nitrogen atom in the 3 position.

The thioureylene aliphatic monocarboxylic acids which can be used according to my invention are among others the beta-(thioureylene) propionic acids, gamma-(thioureylene)n-butyric acids, beta-(thioureylene) isobutyric acids, delta-(thioureylene)n-valeric acids, epsilon-(thioureylene)n-caproic acids, beta-(thioureylene) alpha-ethyl propionic acids, beta-(thioureylene) alpha isopropyl propionic acids, gamma-(thioureylene) alpha-methyl butyric acids, gamma-(thioureylene) alpha-ethyl butyric acids, delta-(thioureylene) beta-methyl valeric acids, and the like. More specific examples of these thioureylene substituted acids which illustrate the substituent groups which may be present on the nitrogen atoms of the thioureylene group are for example, beta thioureidopropionic acid (where the R group of formulae I and II are hydrogen), beta-(N, N-dibutyl thioureylene) propionic acid, beta-(N, N-dibenzylthioureylene) propionic acid, beta-(N, N-diethylthioureylene) propionic acid, beta-(N-isopropylthioureylene) propionic acid, beta-(N-heptylthioureylene) propionic acid, beta-(N-benzylthioureylene) propionic acid, beta-(N-cyclohexylthioureylene) propionic acid, beta-(N, N-dicyclohexylthioureylene) propionic acid, beta-(N-cyclohexyl-N-methyl-thioureylene) propionic acid, beta-(N, N-dibenzyl-N'-phenyl-thioureylene) propionic acid, beta-(N, N-diphenyl-thioureylene) propionic acid, beta-[N-phenyl - N - (alpha-methylbenzyl)-thioureylene] propionic acid, beta-[N-(alpha-methylbenzyl)-N'-phenylthioureylene] propionic acid, beta-(N-methyl-N'-phenylthioureylene) propionic acid, beta-(N-phenylthioureylene) propionic acid, beta-(N-benzyl-N'-phenylthioureylene) propionic acid, beta-[N-(4-biphenyl)-N'-phenyl-thioureylene] propionic acid, beta-(N-butyl-N'-phenylthioureylene) propionic acid, beta-(N-amyl-N'-phenylthioureylene) propionic acid, beta-(N-cyclohexyl-N'-phenylthioureylene) propionic acid, beta-[N, N-di(1-naphthyl) thioureylene] propionic acid, beta-[N-(1-naphthyl)thioureylene] propionic acid, as well as the corresponding substituted thioureylene derivatives of the aliphatic monocarboxylic acids enumerated above.

These thioureylene aliphatic monocarboxylic acids can be prepared by numerous methods. For example, a thiourea can be reacted with the lactone of the corresponding monocarboxylic acid as indicated in the following reaction equation where beta-propiolactone is employed to demonstrate this reaction:

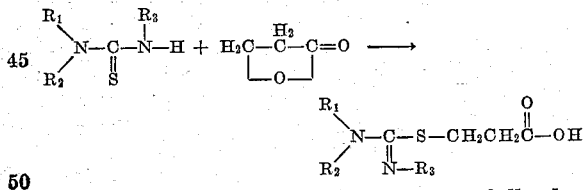

This method of preparation is more fully described in the copending application of Thomas L. Gresham and Forrest W. Shaver, Serial No. 620,661, filed October 5, 1945, now Patent No. 2,474,838.

Although the product of the reaction is shown as the beta-isothioureylene propionic acid derivative, it will be understood that the product might well be the normal thioureylene derivative. The reactant thiourea might also exist in the isothiourea form instead of the normal form as indicated in the reaction equation. These two thiourea configurations are in accord with the Werner theory.

The esters of the above enumerated thioureylene aliphatic monocarboxylic acids can be prepared according to methods well known to the art. Simple esterification of the acids proceeds very slowly in most cases to produce very low yields of the desired ester. One of the most satisfactory methods of esterification is through the acyl chloride which may be prepared by reacting the acid with thionyl chloride. An alcohol with the desired hydrocarbon group is then reacted with the acyl chloride. A hydrochloride (quaternary ammonium salt) of the ester of the thioureylene substituted acid is readily produced by this esterification reaction in yields of about 95 to 98%. If the free ester is desired, the hydrochloride is neutralized in the usual manner. Thus, such esters as, for example, the methyl, ethyl, butyl, isobutyl, tertiary butyl, n-amyl, isoamyl, octyl, and cetyl esters as well as allyl, aralkyl and aryl esters can be prepared. These hydrochloride thioureylene aliphatic acid esters and the free esters in general have properties which have some utility according to this invention.

The above thioureylene aliphatic acids can be further modified by adding a hydrohalide such as hydrogen chloride to one of the amino nitrogen atoms to form a quaternary ammonium hydrohalide of the acid. For example, to beta-(isothioureido) propionic acid there is added an amount of hydrogen chloride slightly in excess of one mole of hydrogen chloride for each mole of the acid. The resulting product is beta-(isothioureido) propionic acid hydrochloride which is water-soluble, neutral and extremely stable whereas beta-(isothioureido) propionic acid is not soluble in water, strongly basic, and readily decomposes by hydrolysis. In general, the thioureylene substituted aliphatic monocarboxylic acids are unstable and by this convenient method can be modified to produce stable products which can be more readily and economically employed as repellents.

The following examples of laboratory and field experiments demonstrate the efficiency of the thioureylene aliphatic monocarboxylic acids, esters and salts as rat repellents.

In the laboratory, tests have been made on white rats of the Wistar and Sherman strains. But, since the Sherman strain proved to be the most difficult to repel, the following examples show only the results obtained in the laboratory with this strain. The thioureylene aliphatic monocarboxylic acids and esters, in general, are insoluble in water so various methods of applying these repellents were used. The most successful methods of employing these repellents are noted in the examples. The quaternary ammonium salts, such as the hydrochlorides, of the acids and esters are water-soluble so the method of applying them presents no serious problem.

Laboratory tests

*Example 1.*—10 rats in separate cages—each rat was given choice of three feeds:

(a) Ground corn with 1% by weight of beta-isoureidopropionic acid—no feeding in 36 hours.
(b) Rockwell food concentrate pellets ground, incorporated with 1% beta-isoureidopropionic acid and a binder, and then reformed into pellets—no feeding in 36 hours.
(c) Rockwell pellets dipped into a 10% aqueous solution of methyl beta-(isothioureido) propionate hydrochloride and dried—no noticeable feeding in 36 hours. 2 rats dead in 72 hours after consuming four pellets. Each showed advanced edema of the lungs.

*Example 2.*—10 rats previously starved for 24 hours given choice of:

(a) Ground corn containing 0.5% by weight of beta-isothioureidopropionic acid—no noticeable feeding.
(b) Garbage containing 0.5% by weight of beta-isothioureidopropionic acid — no noticeable feeding.
(c) Apple slices on which 0.5% beta-isothioureidopropionic acid had been deposited—no noticeable feeding.

In this test the rats were allowed to starve to death. The internal organs of each dead rat were examined shortly after death. One rat showed advanced edema of the lungs which indicated that the rat probably had fed on the treated food and had consumed a sufficient amount of the treated food to ingest a lethal dose of the repellent.

*Example 3.*—10 rats unfed for 24 hours given drinking water prepared as follows: To 100 parts by weight of water containing 0.125 part by weight of sodium bicarbonate, there was added 0.5 part of beta-isothioureidopropionic acid which dissolved in the bicarbonate solution. The same rats were given Rockwell food pellets treated as follows: to 2.5 parts by weight of ground Rockwell pellets there was added 1.2 parts of beta-isothioureidopropionic acid, 0.1 part of sugar and a small amount of binder to permit the mixture to be made up into pellets. A majority of the rats starved to death and/or died of thirst. A few of the frustrated ravenous rats consumed a sufficient amount of the treated food to ingest a lethal dose and died within a short time. An examination of the internal organs of these rats showed advance stages of edema of the lungs.

*Example 4.*—10 previously starved rats were given no water or food except pieces of chocolate containing 4.75% by weight of beta-isothioureidopropionic acid. The rats did not feed on the treated chocolate during a period of 24 hours.

*Example 5.*—10 rats were kept on a diet of dry food and water prepared by dissolving 0.5 part by weight of beta-isothioureidopropionic acid in 100 parts by weight of water containing 0.125 part by weight of sodium bicarbonate. The rats refused to drink the treated water and a few were allowed to die of thirst while the remaining rats given untreated water survived.

*Example 6.*—10 rats were kept on a diet of dry food and drinking water containing 0.5 part by weight of methyl beta-(isothioureido) propionate hydrochloride therein dissolved. The rats refused to drink the water.

*Example 7.*—10 rats were subjected to the same treatment as in Example 6 except that these rats were given water to drink which contained 0.5% beta-isothioureido propionic acid hydrochloride dissolved in the water. The rats also refused to drink this water.

In the field, the repellents were used in orchards, barns, grain storage bins, warehouses where packaged foodstuffs were stored, market places, etc. with the results shown in the following examples. While these examples demonstrate the results obtained by the use of a specific thioureylene aliphatic monocarboxylic acid, its salts and esters, other compounds of this class where the aliphatic acid residue is that of butyric, isobutyric, valeric acids and the like and/or where the thioureylene radical contains alkyl, aryl or aralkyl radicals, may be used with substantially equivalent results.

Field tests

*Example 8.*—Chicken feed packaged in kraft paper sacks coated with paraffin wax containing 2% by weight of beta-isothioureidopropionic acid were placed on a city garbage dump known to be infested with Norway rats. None of the bags shows rat destruction after three weeks of exposure.

*Example 9.*—Kraft paper bags containing chicken feed treated with a repellent solution prepared by dissolving 0.5 part by weight of beta-isothioureidopropionic acid in a solution of 0.125 part of sodium bicarbonate in 100 parts of water were placed on a city garbage dump known to be infested with Norway rats. None of the bags showed rat destruction after three weeks of exposure.

*Example 10.*—The trunk bark of trees in an apple orchard known to contain sizable rat and mouse colonies was treated during the winter with an aqueous emulsion containing 10% by weight of beta-isothioureidopropionic acid and an adhesive for the repellent. There was only slight rodent damage to the treated trees, but adjoining untreated and unprotected trees suffered considerable damage.

*Example 11.*—Cereal packages containing individual servings of prepared ready-to-eat cereals were coated with a composition containing paraffin wax and 1% by weight of beta-isothioureidopropionic acid. These treated packages were placed in a barn, on a city dump, in a warehouse where foodstuffs were stored, and in markets to expose these packages to rats and mice under varying conditions. After six weeks exposure, there was little or no damage by rats or mice and what damage was done did not fully penetrate the outer wrapper.

*Example 12.*—A variety of treated food materials were distributed in a barn where rats and mice were known to exist. These treated foods consisted of ground corn on which 1% by weight of beta-isothioureidopropionic acid had been deposited and Rockwell food concentrate pellets which had been ground, mixed with 1% by weight of beta-isothioureidopropionic acid and remade into pellets. Over a period of three weeks these treated foods remained untouched.

*Example 13.*—Apple twigs which had been dipped into an aqueous emulsion containing 10% by weight of beta-isothioureidopropionic acid and dried, were placed under a straw mulch cover in a peach orchard where a relatively high mouse population had been attracted. The straw was raised, the treated twigs were placed over the burrows and the straw was replaced. Treated and untreated twigs in equal numbers were in this manner distributed throughout the orchard. The untreated twigs were marked for simple visual identification. The twigs were inspected periodically and it was observed that while most all of the untreated twigs had been chewed upon and many of the untreated twigs had been removed by the rodents, the treated twigs were for the most part untouched. The little damage that did occur to the treated twigs was extremely slight and would not have been injurious if the twigs had been young growing nursery tree stock.

*Example 14.*—The trunk bark of trees in an apple orchard known to contain sizable rat and mouse colonies was treated during the winter with an aqueous dispersion containing about 10% by weight of polymeric ethylene polysulfide in which 10% by weight of methyl beta-(isothioureido) propionate hydrochloride had been dissolved. There was negligible damage to the trunk bark during the winter.

*Example 15.*—Beta-isothioureidopropionic acid hydrochloride was employed as the repellent according to the procedure of Example 14 in a concentration of 7%. The damage by gnawing was negligible even over an entire winter season.

Although the above examples illustrate the use of one acid and derivatives of this acid within this new class of rodent repellents, other thiourelyene aliphatic monocarboxylic acids as well as esters and salts of these acids can be used with substantially equivalent results. In general, the beta-thioureylene propionic acids, esters and salts are preferred as repellent materials because of the availability of the reactants required to prepare these compounds. The beta-thioureylene propionic acids and esters in general, and especially beta-isothioureidopropionic acid and its esters are colorless, odorless, tasteless, relatively insoluble in water, non-phytotoxic and apparently nontoxic to humans. As before stated, the quaternary ammonium salts of the acids are water-soluble. Thus, they have the desirable qualities which are required of a chemical rodent repellent.

Since the thioureylene aliphatic acids and esters are insoluble in water, various means of employing them have been used. These repellent materials can be deposited on an article to be protected by applying a solution of a water-soluble salt of the acid, such as the sodium salt or the hydrochloride and then reforming the acid on the article to be protected by any of the usual methods or the water-soluble salt may be left as such on the article when it will not be subjected to conditions of leaching. Another method of employing the thioureylene aliphatic acid repellents is to disperse the repellent in water with a wetting or dispersing agent and applying the aqueous dispersion thus prepared to the article to be protected. Or the hydrohalide quaternary ammonium salt of the ester which is water-soluble can be employed. Where the form of the repellent is water-soluble and subjected to weathering usually it will be desirous to add an adhesive or sticking agent to the solution to prevent the repellent from being removed by rain or other forms of moisture. One of the preferred methods of applying the water-insoluble members of this new class of rodent repellents is to apply them as aqueous dispersions by adding the required amount of the repellent in a finely-divided form to an aqueous dispersion of a polymeric organic polysulfide which is capable of forming a microscopic, translucent, discontinuous, rubbery film on drying. The preparation of these aqueous dispersions of polymeric organic polysulfides is described in U. S. Patent No. 2,106,564 and in a copending application of William D. Stewart, Serial No. 599,316 filed June 13, 1945, now Patent No. 2,470,115. The water-soluble quaternary ammonium salts of the acids and esters may also be dissolved in these dispersions of these polymeric polysulfides which on drying will prevent the removal of the repellent by moisture. Still another method of employing this new class of rodent repellents is to incorporate the repellent in such coating materials as paraffin wax and then apply the wax composition usually to packaging means. These rodent repellents can also be incorporated in plastic coating and film forming materials, in paper pulp or can be deposited on fibers from which bags are made and the repellent containing composition then made up into packaging means. These repellents can also be mixed with suitable dry porous diluents such as clays, talc and the like and be employed as dusts to protect stored goods. Thus, it is apparent that these thioureylene aliphatic monocarboxylic acids, esters and salts can be easily and economically employed as rodent repellents.

While I have disclosed specific examples of my invention, I do not thereby desire or intend to limit myself solely thereto, for as hitherto stated the precise proportions of the materials utilized may be varied and other members of this class of rodent repellents may be employed if desired, without departing from the spirit and scope of the invention as defined in the appended claims.

I claim:

1. A rodent repellent composition which comprises as the essential active ingredient 0.5% to 10% by weight of beta-isothioureidopropionic acid and as a carrier therefor an aqueous medium in which said active ingredient is uniformly dispersed.

2. A rodent repellent composition which comprises as its essential active ingredient 0.5% to 10% by weight of methyl beta-(isothioureido) propionate hydrochloride and an aqueous solution of a dispersing agent as a carrier therefor.

3. A rodent repellent composition which comprises as its essential active ingredient 0.5% to 10% by weight of beta-isoureidopropionic acid hydrochloride and an aqueous solution of a dispersing agent as a carrier therefor.

4. A rodent repellent composition which comprises as its effective active ingredient 0.5% to 10% by weight of a compound selected from the group consisting of the compounds having the formulae:

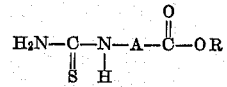

and

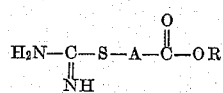

where A is a bivalent saturated hydrocarbon radical having two to six carbon atoms and where R is selected from the class consisting of hydrogen and hydrocarbon radicals, and their quaternary ammonium salts; and a carrier for said active ingredient, the active ingredient being uniformly associated throughout the entire mass of the carrier.

LUTHER L. BAUMGARTNER.

REFERENCES CITED

The following references are of record in the file of this patent:

UNITED STATES PATENTS

| Number | Name | Date |
|---|---|---|
| 1,871,949 | Bottrell | Aug. 16, 1932 |
| 2,222,638 | Szilard | Nov. 26, 1940 |
| 2,293,531 | Brooks | Aug. 18, 1942 |
| 2,390,848 | Richter | Dec. 11, 1945 |

OTHER REFERENCES

Andreasch-Beilstein, Handbuch der Org. Chemie, 4th Ed., vol. 3, pages 299 and 300 (1921).